US008335528B2

(12) United States Patent  
Ryan (10) Patent No.: US 8,335,528 B2
(45) Date of Patent: Dec. 18, 2012

(54) SYSTEM AND METHOD FOR ELECTRONIC MESSAGING WITH GROUP SENDING, RECEIVING, AND REPLYING CAPABILITES

(75) Inventor: Mark Ryan, McMinnville, OR (US)

(73) Assignee: Communication Enhancement Products, Inc., Las Vegas, NV (US)

( * ) Notice: Subject to any disclaimer, the term of this patent is extended or adjusted under 35 U.S.C. 154(b) by 0 days.

(21) Appl. No.: 12/928,853

(22) Filed: Dec. 20, 2010

(65) Prior Publication Data

US 2011/0165895 A1   Jul. 7, 2011

Related U.S. Application Data

(60) Provisional application No. 61/284,455, filed on Dec. 18, 2009.

(51) Int. Cl.
*H04W 4/00* (2009.01)

(52) U.S. Cl. .......... 455/466; 455/59; 370/390; 370/432; 370/466

(58) Field of Classification Search ................... 455/466; 370/390, 432, 466
See application file for complete search history.

(56) References Cited

U.S. PATENT DOCUMENTS

2006/0120367 A1* 6/2006 Beckmann et al. ........... 370/390
2011/0143784 A1* 6/2011 Ahluwalia .................... 455/466

* cited by examiner

*Primary Examiner* — David Q Nguyen
(74) *Attorney, Agent, or Firm* — Brian R. Galvin; Galvin Patent Law LLC (57) ABSTRACT

A system for electronic messaging, comprising a first device adapted to send and receive electronic messages using a short message service protocol of a wireless communications network and a plurality of second devices adapted to send and receive electronic messages using a short message service protocol of a wireless communications network, wherein the first device assembles an electronic message to send to a plurality of second devices at least in part by inserting a destination address into a user data header information element of the electronic message for each of said plurality of said second devices to which the electronic message is to be sent, is disclosed.

4 Claims, 7 Drawing Sheets

SYSTEM AND METHOD FOR ELECTRONIC MESSAGING WITH GROUP SENDING, RECEIVING, AND REPLYING CAPABILITES

CROSS-REFERENCE TO RELATED APPLICATIONS

This application claims priority to U.S. Provisional Patent Application Ser. No. 61/284,455, filed on Dec. 18, 2009, with the same title as the instant application, the contents of which are hereby incorporated by reference in their entirety.

BACKGROUND OF THE INVENTION

1. Field of the Invention

The present invention is in the field of wireless telecommunications, and more particularly to the field of short message systems (SMS) and replied messaging techniques.

2. Discussion of the State of the Art

One of the more widely used mobile communications technologies globally is known as SMS (from Short Message System). SMS enables users of mobile terminals (mostly, but not only, mobile phones) to send small messages simply and inexpensively to one or more other users on the same or a different mobile communications network. Typically both senders and recipients pay a per-message fee to their service provider, although it is becoming more common for service providers to offer flat rate plans (for example, unlimited text messages for $20 per month). SMS messages are generally limited to 140 characters in length (in fact, this limitation of SMS is what drove the 140 character limit in the now-ubiquitous Twitter™ service), although this limit may vary when different character sets are used; the SMS standard specifies 140 octets, or eight-bit data elements, as a standard short message length, so use of different character-encoding schemes leads to different character length limitations. Further extensions to the SMS concept have been introduced by carriers, in particular the service referred to as MMS (multimedia message service), which allows simple, inexpensive transmission of messages between users that can carry within them multimedia objects such as photos, videos, audio clips, and the like.

Without a doubt, the popularity of SMS-based services has been based largely on their simplicity and their ability to operate on a wide variety of devices. While "smart phones" account for a larger share of mobile devices sold each year, a large majority of existing mobile devices are what are known as "feature phones", or relatively straightforward mobile phones with a few basic features such as address books, call histories, SMS services, and the like. Thus one can send an SMS to another and be fairly confident that it will be received, since SMS messages are typically sent to mobile devices and essentially all mobile devices are capable of sending and receiving text messages (of course, not all mobile users have subscribed for SMS or text messaging services, and SMS is a store-and-forward service with no guarantee of delivery, so it is not certain that any given message will be received by its intended recipients). The SMS service is deliberately a simple one, which has served both to stimulate adoption and to encourage innovation amongst third parties. To send a message, a user simply selects one or more addressees (or targets), and types in a message of up to 140 characters, and clicks "send" (or equivalent). The SMS system built into the mobile device being used then simply generates one message for each addressee; each message is addressed to that addressee and contains the text message. Neither the identities nor the addresses of the other recipients is sent with any recipient's message (unless of course the sender chose to type the other names in the message itself, which is both expensive and cumbersome—each message has a cost, and a text message that starts with a series of numerical addresses is much less easy to read).

It is commonplace, in more "advanced" communications technologies such as email, to provide users with a capability of listing multiple intended recipients, either as "To:" recipients or as "Copy to:" recipients (of course, "BCC:", or blind copy, is also well known in the art). This has proven beneficial as recipients can choose to "Reply All", or can choose to reply to some subset of the original recipients, without having to reenter the names or numbers of each of the addressees. This convenience has not been available in SMS systems known in the art, for the simple reason that the simplicity of the SMS service has prevented it. A recipient of an SMS (or MMS) message that was sent to many recipients will only know that she in particular was a recipient; none of the additional addresses to which the original message was sent is included in a recipient's copy.

It is an object of the present invention, therefore, to provide a system and method for sending short messages with group sending, receiving, and replying capabilities to enable a more "modern" communications paradigm to be used with a very widespread communications technology. Having the ability, as a user or as an application, to note all of the original addressees, and to select options such as "Reply All", is clearly advantageous over the current art, and would make the SMS text messaging (and the similar MMS multimedia message service) more flexible and more consistent with other prevalent communications modalities.

SUMMARY OF THE INVENTION

In a preferred embodiment of the invention, a system for electronic messaging is disclosed, comprising a first device adapted to send and receive electronic messages using a short message service protocol of a wireless communications network and a plurality of second devices adapted to send and receive electronic messages using a short message service protocol of a wireless communications network. According to the embodiment, the first device assembles an electronic message to send to a plurality of second devices at least in part by inserting a destination address into a user data header information element of the electronic message for each of said plurality of said second devices to which the electronic message is to be sent.

In another preferred embodiment of the invention, a system for electronic messaging is disclosed, comprising a first device adapted to send and receive electronic messages using a short message service protocol of a wireless communications network and a plurality of second devices adapted to send and receive electronic messages using a short message service protocol of a wireless communications network. According to the embodiment, the first device assembles an electronic message to send to a plurality of second devices at least in part by inserting a destination address into a user data header information element of the electronic message for each of said plurality of said second devices to which the electronic message is to be sent. Also according to the embodiment, at least one of the second devices is adapted to reply to the first device and at least one other second device using at least one destination address retrieved from an information element in a user data header of the electronic message.

In another preferred embodiment of the invention, a system for electronic messaging is disclosed, comprising a first device adapted to send and receive electronic messages using a short message service protocol of a wireless communications network and a plurality of second devices adapted to send and receive electronic messages using a short message service protocol of a wireless communications network. According to the embodiment, the first device assembles an electronic message to send to a plurality of second devices at least in part by inserting a destination address into a user data header information element of the electronic message for each of said plurality of said second devices to which the electronic message is to be sent. Also according to the embodiment, the first device is a server adapted to receive an electronic message from a user over a data network and to then submit the electronic message using a short message protocol of a wireless communications network.

In yet another preferred embodiment of the invention, a method for electronic messaging, comprising the steps of (a) assembling an electronic message using a short message service protocol of a wireless communications network, (b) inserting destination addresses of a plurality of recipients to which the electronic message is to be sent into information elements of a user data header of the electronic message, and (c) sending the electronic message to the plurality of recipients using at least one wireless communications network, is disclosed.

DETAILED DESCRIPTION

Figure 1:
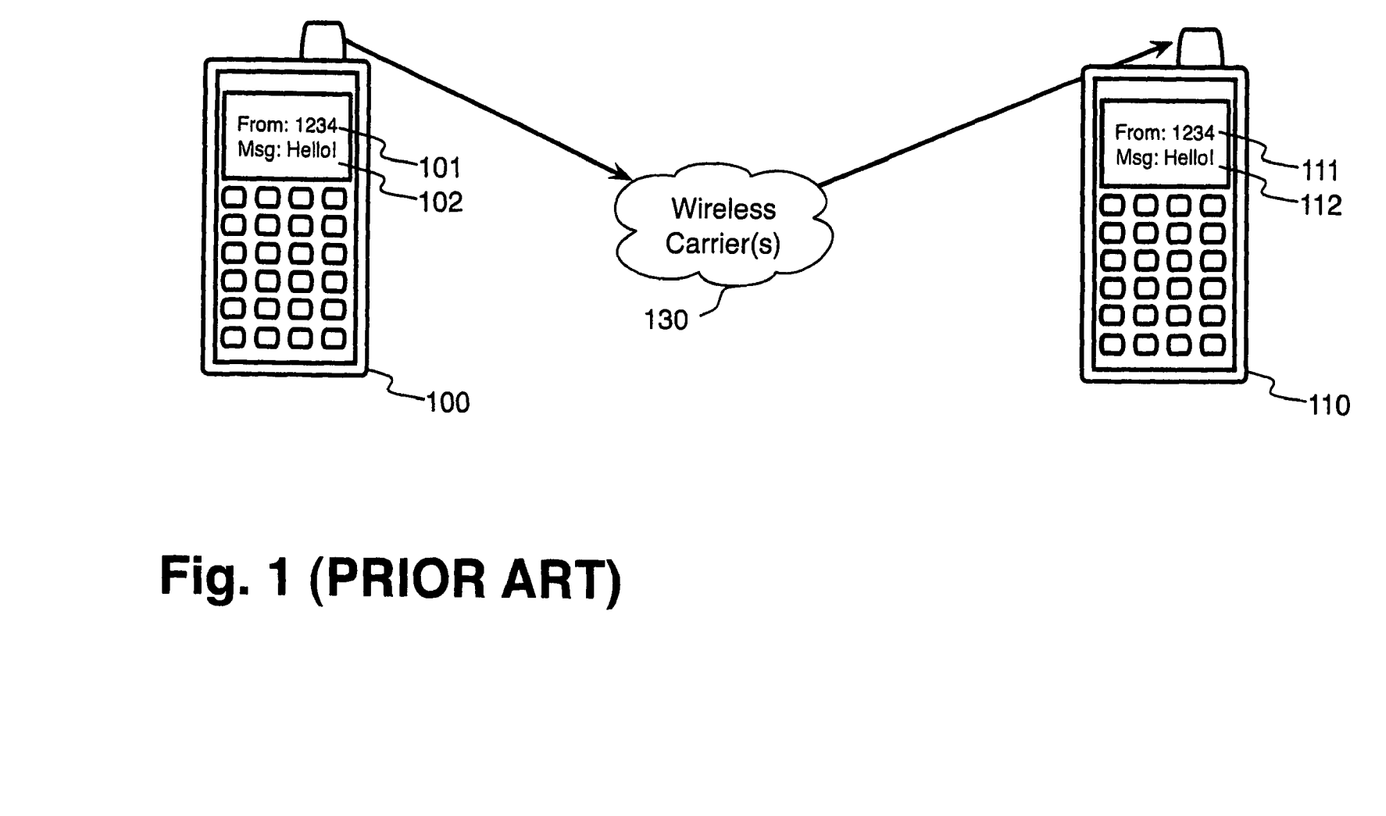
FIG. 1 (PRIOR ART) is a block diagram of a system for delivering a short message service (SMS) in wireless telephony networks, according to the art.

The inventors provide, in a preferred embodiment of the invention, a system for providing short message service (SMS) capabilities that are enhanced by provision of group sending, receiving, and replying options not currently available in the art. FIG. 1 provides an illustration of a typical SMS use case known in the art today. A sender uses mobile device 100 to create an SMS message consisting at least of a destination address 101 and a text message body 102 to send. When a user sends such an SMS message, it is normally carried across one or more mobile communications networks operated by one or more wireless carriers 130. In the art, when a new message is received by a wireless carrier 130, a location of its destination is determined by, for example, querying a location database such as those used in the art of wireless communications to locate individual wireless devices. It is common in the art for an intended recipient terminal device 110 to be located "on" (or connected to) a different wireless carrier's 130 network, and more than one wireless or other network may carry an SMS message from its source wireless carrier 130 (the one serving wireless device 100, where the SMS message in this case originated) to its destination wireless carrier 130 (the one serving destination wireless device 110). It should be understood by one having ordinary skill in the art of mobile communications that any number of intervening network architectures and transformations may occur between a source device 100 and a destination device 110, according to the art, without departing from the scope of the invention. Furthermore, while source device 100 and destination device 110 are typically shown in the figures to appear as mobile or cellular phones, they need not be; any type of terminal device capable of sending or receiving SMS (or MMS or equivalent) messages across one or more networks to another terminal device, even if no wireless communications is used, can be used according to the invention. The key characteristic of source terminal device 100 and destination terminal device 110 is that they are equipped to handle SMS messages. Like source terminal device 100, destination terminal devices 110 in the art generally provide a visual data element indicating a source 111 of an SMS message, and another visual element providing a text message 112 to a recipient user (generally, of course, source text message 102 and received text message 112 are identical).

Figure 2:
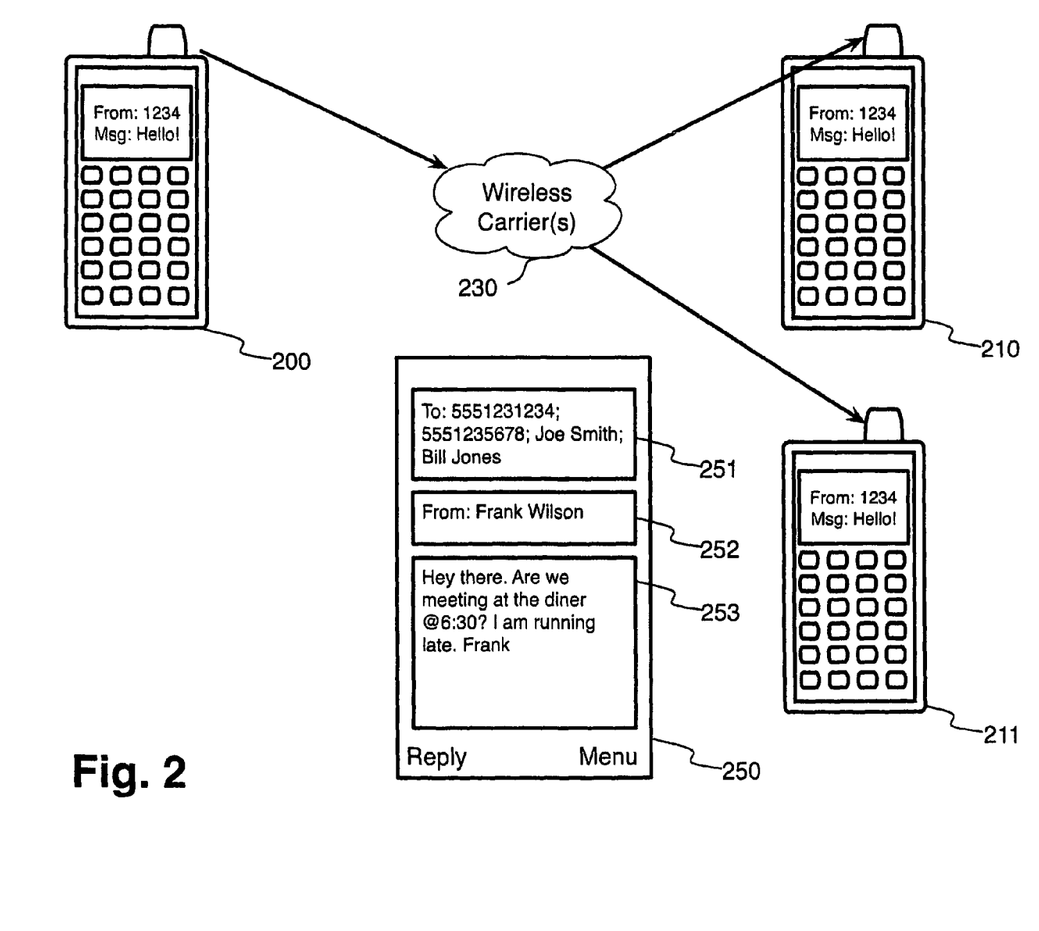
FIG. 2 is a block diagram of a preferred embodiment of the invention, in which SMS messages are sent with multiple addressees.

The general approach envisioned by the inventors to extend the capabilities of the SMS and related technologies is to make advantageous use of certain data header elements, that are specified in the relevant standards and are invisible to end users, to carry additional information required to carry out the invention. FIG. 2 provides an example, according to a preferred embodiment of the invention, of a typical use case in which enhanced group sending, receiving, and replying capabilities are provided in an SMS system. A sending user composes a message on a mobile terminal device 200. User interface 250 is exemplary of the type of user interfaces available in the art today for sending and receiving SMS messages. It consists of a destination field element 251, an optional source field element 252, and a text message body element 253. In an exemplary embodiment illustrated in FIG. 2, destination field element 251 is fashioned as a "To:" list, analogous to those used commonly in email systems in the art. Similarly, source field element 252 is, in the embodiment, fashioned as a "From:" line, again as is common in email systems. Note that third party systems exist in the art today for assembling and sending SMS messages from computers via dedicated applications resident on those computers or via web pages utilized from within browser applications on those computers; in these services, the service provider takes data from the applicable application and prepares it for submission to a wireless carrier 230 as an SMS message. In what follows, various embodiments are discussed that involve manipulating SMS message headers to enhance the capabilities of SMS messaging systems; such header manipulations can be carried out by an actual sending user (as illustrated in FIG. 2) or by an intermediary such as a third party web services enabling end users to send text messages from PCs, without departing from the scope of the invention. In general, applications resident on a user's terminal device, or a user using a mobile terminal device, or an application operating on a third party terminal device on behalf of a remotely located user, or a user operating a remote terminal device and acting on behalf of another, and all of the above with or without the use of one or more intermediaries, are examples of "who" or "what" can construct enhanced SMS messages with multiple addresses stored in a user data header, according to the invention.

Returning to FIG. 2, in a preferred embodiment, when a sending user enters multiple destination addresses 251 on a terminal device 200 and then presses "Send" or equivalent, an SMS message is sent via one or more wireless carriers 230 to a plurality of destination terminal devices such as mobile phones 210 and 211 (again, other types of terminal devices may be used). Unlike in the prior art, however, these recipients will receive a message with an appearance such as that shown in SMS message window 250. Each of the original recipients will be listed in destination field element 251 of the terminal devices 210, 211. In some embodiments, one or more terminal devices 210, 211 automatically performs a name look up in an onboard contacts or name database, typically using a mobile number as a lookup key, so that, for example, in window 251, the name "Joe Smith" and "Bill Jones" appear instead of the mobile numbers associated with terminal devices 210, 211 corresponding to "Joe Smith" and "Bill Jones". When an SMS message 251 is received on a terminal device 210, 211 that is not equipped with an onboard contacts or names database, all addresses in destination list window 251 would be numerical in nature. Also, because non-mandatory or not understood data elements within SMS message headers are generally ignored by terminal devices 210, 211, those terminal devices 210, 211 that are less capable than others will simply show a "normal" SMS message when receiving an enhanced SMS message according to the invention, since the enhancements are, as described below, encoded in extra data fields in SMS message header elements and would thus be ignored by those terminal devices.

Figure 3:
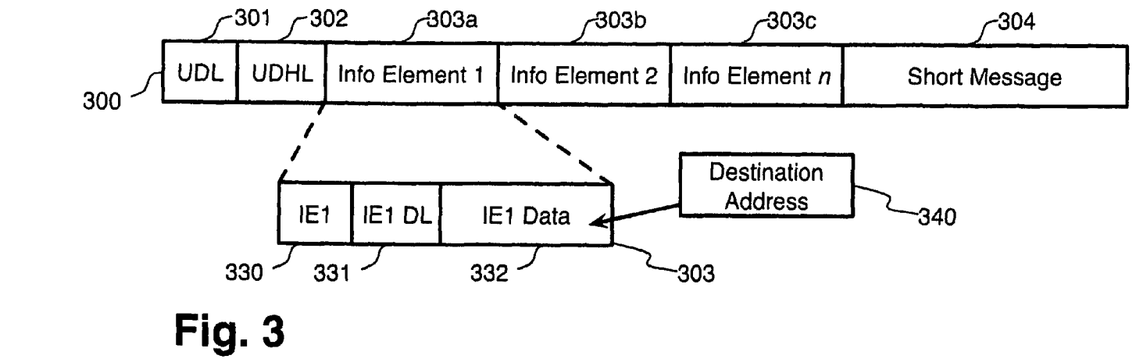
FIG. 3 is a block diagram of a preferred embodiment of the invention, in which recipients of SMS messages sent in accordance with the invention are able to reply to a plurality of addressees of a single message.

In order to more particularly disclose how SMS functionality is enhanced by the inventor's conception, FIG. 3 illustrates a typical SMS message data packet 300. In general, SMS messages can be sent in either a simple text mode or a mode known in the art as PDU mode (PDU stands for "Protocol Description Unit"). In text mode, up to 140 octets (or 140 times eight bits) of plain text are assembled into a single packet and transmitted by wireless carriers 230. In PDU Mode, SMS messages are comprised of a fixed-length (nominally, seven octet) header and a user data part 300. A single bit in the fixed-length header (typically the sixth bit) indicates whether the user data part 300 includes a user data header (UDH) or not; if not, the entire user data part is available for text message payload. User data part 300, when it includes a user data header (UDH), is structured as shown in FIG. 3. A first octet of user data part 300 contains user data length (UDL 301), which is a length in octets of the entire user data part 300. Where a user data header (UDH) is indicated to be present, the next octet in user data part 300 will be a user data header length (UDHL 302), which indicates the length in octet of the associated user data header, which is comprised of information elements (shown in FIG. 3 as information element 1 303a, information element 2 303b, and information element n 303c, where n can be any number up to about 255, and represents the number of the last information identifier 303 in user data part 300). Information elements 303 are then followed by the actual short message 304 payload, whose length generally varies based on the size of the associated user data header (UDH). According to industry standards for SMS messages, information elements 303 are of standard form, comprised of three fields each. Each informational element 303 comprises an information element identifier 330 (one octet in length; labeled as "IE1" in FIG. 3, meaning the first information element of user data part 300 is shown in the expanded view portion of FIG. 3), an information element data length 331 (also one octet in length), and then information element data 332 itself (whose length is given by information element data length 331). Information element identifier (IEI) 331 is given a value from 0 to 255 (that is, 00 to FF in hexadecimal notation), where each value conveys the purpose (and content type) of the associated information element 330. Many of the 256 possible IEI values are predefined in industry standards; for instance, an IEI of 00 signifies that the information element is an 8-bit reference number for an concatenated SMS message, and an IEI of 09 signifies that the information element specifies what wireless control message protocol is used for the SMS message in question. However, there are entire ranges of values within the range of 0 to 255 that are not specified by industry standards (for example, the range from 0A to 6F is "Reserved for future use").

In a preferred embodiment of the invention, one value from among the unused possible IEI 330 values is used to designate an SMS message as an enhanced message (that is, enhanced in accordance with the instant invention); it is not important which of the available unassigned IEI values is used, as long as all enhanced messages use a single value, which in some embodiments could be added to industry standards and made available via a wide variety of terminal devices (which would need to recognize the enhanced message value). It is anticipated that a variety of uses, some of which may be quite proprietary, can be made of the instant invention, each of which would in general use a different enhanced message identifier. In addition (or alternatively; an enhanced message IEI 330 value is not necessary to all embodiments of the invention), in a preferred embodiment, a designated IEI 330 value is used to designate a plurality of Information Elements 303 as containing message destination addresses. Each Information Element 303 that has this specific value as its IEI 330 (for example, IEI B0 could be used, and will be for illustrative purposes, although it should be noted that any unassigned value can be used, according to the invention) is designated as containing, in its Information Element Data field 332, a numerical address 340 of a destination to which the enhanced message should be sent. If there are, as in FIG. 2 (see message 250), 4 destination addresses 340, then there will be 4 Information Elements 303 within each message's user data header. According to the invention, one destination address could be stored per Information Element 303, or one Information Element 303 could be used to store all of the destination addresses. (If one address is stored per Information Element 303, then there is a message length cost per address, one for the Information Identifier and one for the Information Element Data length; if all the addresses are put in one Information Element 303, then there is a message length cost per address of one byte, since there needs to be a one byte delimiter to separate addresses, for instance, "tilda").

Note that, as in normal SMS messages (that is, SMS messages that are not enhanced with the instant invention), most terminal devices will send a separate SMS message to each destination address 340 specified in message 250. What is different, according to the invention, is that each of the separate messages contains all of the destination addresses within its user data header, so that each receiving terminal device is able to access these addresses and display all of the original target addresses in the message on each receiving terminal device (except of course for terminal devices that are not equipped to handle SMS message enhancements of the instant invention; for these terminal devices, enhanced SMS messages are indistinguishable from normal SMS messages, as only the address of the particular recipient terminal device is carried in normal SMS messages).

In most embodiments of the invention, IE Data 332 representing destination addresses is numerical (typically, the data is simply the wireless number of the target terminal device), but this is not necessary to the invention. In some embodiments, actual names (such as "Joe Smith" in destination address list 252) can be stored in IE Data 332; it is essential only that the IEI 330 be the designated value (such as B0 in our example), and that both the sending and receiving terminal devices are able to do a number lookup to convert the name "Joe Smith" into the number "wireless address of Joe Smith's terminal device or mobile phone"; this is necessary because wireless networks operate using phone numbers and don't accept names as destination addresses.

Figure 4:
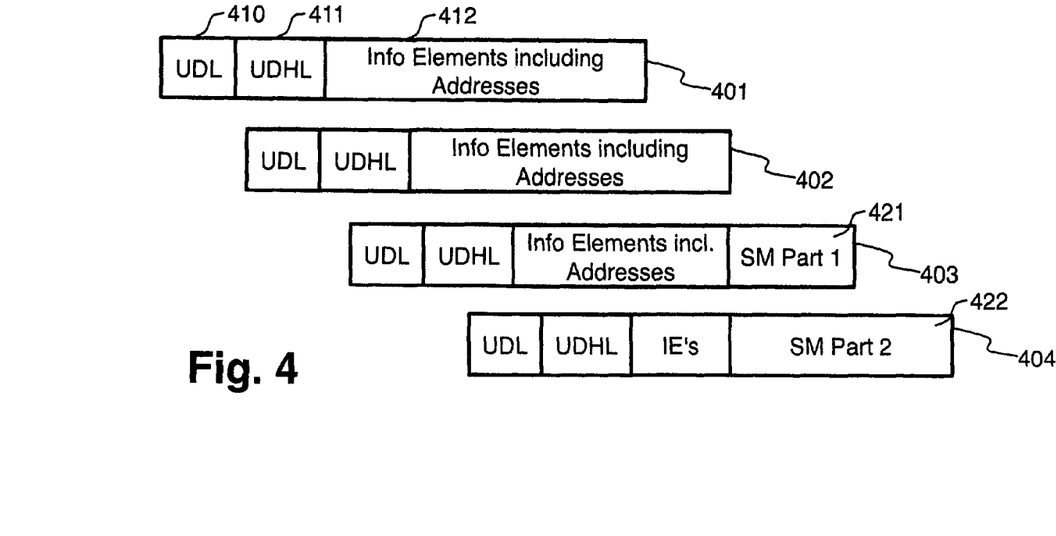
FIG. 4 is a block diagram of a preferred embodiment of the invention in which SMS Concatenation is utilized.

In the art, large messages can be sent via SMS systems by breaking them down into a series of concatenated SMS messages that are then reassembled at a destination. Typically this is done using systems adhering to standards such as CSM (Concatenated Short Message), and these in turn typically use a particular IEI 330 to designate reference identifications for each component sub-message of a concatenated SMS. In a preferred embodiment of the invention, shown in FIG. 4, concatenated SMS is used to allow sending of large messages with potentially large lists of destination addressees. Generally, a single PDU mode SMS message has a fixed length that is used both for a user data header and for message payload. If more than a small number of addressees is required according to the invention, such as in a bulk messaging application, there would quickly be no space left for an actual message. Moreover, Concatenated SMS was developed to allow sending of large (more than 140 character) messages using the simple and ubiquitous SMS technology (in fact, MMS is a another example of this idea of extending SMS to larger message types), and it is desirable to maintain the ability to send large messages. The basic idea of concatenated SMS is that message sequence data is stored in a user data header information element 303 with a particular IEI 330, just as address data is according to the invention (but of course with a different IEI value 330). In FIG. 4, a long message contained in SM Part 1 421 and SM Part 2 422 is sent to a large number of addressees using a method according to the invention. While there is no precise limit on the number of addresses that can be handled using the invention (that is, passed to each recipient in user data header information elements 412), the overall number of information elements 303 is limited to 255, since User Data Header Length (UDHL) 411 is only one byte (octet) long. Since large address lists will require concatenated SMS (requiring at least one CSM reference number information element 303 per SMS message 401), at least some of the UDH Information Elements 412 will be used for purposes other than storing addresses, so there will always be some practical limit below 255 of total destination addressees that can be handled according to the invention. By using a plurality of messages 401-404, embodiments of the invention using Concatenated SMS are able to send long messages to a large number of addressees, and each addressee will be able to see and manipulate a complete list of all destination addressees (except of course those with mobile devices that cannot operate in PDU mode or cannot process concatenated SMS, or are not equipped to process SMS messages enhanced according to the invention).

Figure 5:
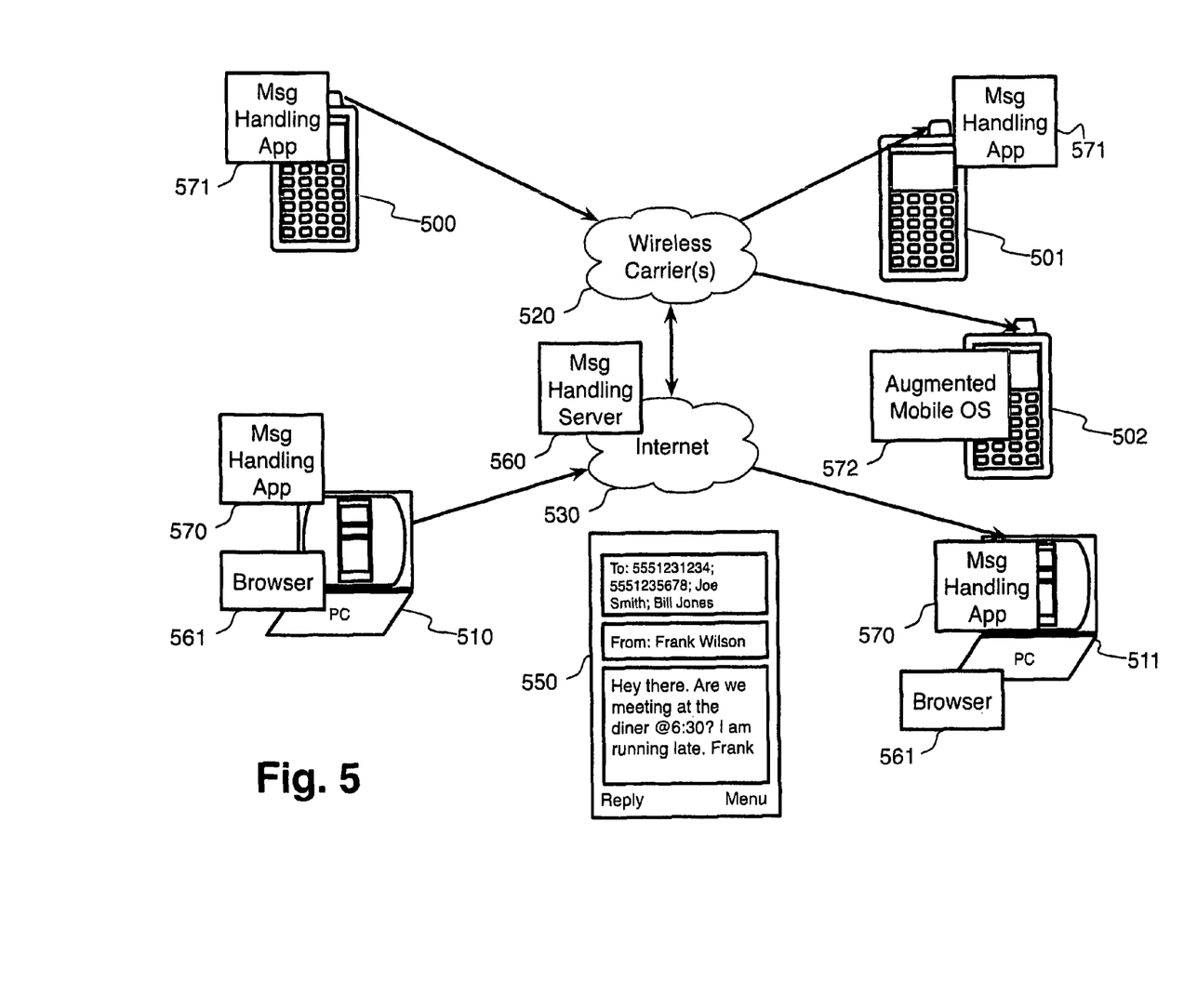
FIG. 5 is a block diagram of a preferred embodiment of the invention, showing a variety of terminal devices capable of sending and receiving messages in accordance with the invention.

FIG. 5 illustrates a variety of terminal devices capable of interacting, according to the invention, with enhanced SMS messages 550. The devices shown in FIG. 5 are exemplary in nature, and do not represent an exhaustive list of possible devices that can be used according to the invention. Mobile phone 500 is a typical mobile feature phone, with a message handling application 571 installed to enable it to process SMS messages 550 enhanced according to the invention, and receiving SMS services via mobile carrier 530. Mobile phone 501 is a "smart phone" with an advanced mobile operating system, and one or more message handling applications 571 operating in conjunction with that operating system, and receiving SMS services via mobile carrier 530. Mobile handset 502 has a mobile device operating system that is enhanced in that it has been provided with a capability to handle enhanced SMS messages 550 of the invention at the operating system level, and receiving SMS services via mobile carrier 530. To be clear, a distinction between devices 501 and 502 in this example is that the former has a standard operating system but has an "invention-aware" application running that processes enhanced SMS messages 550 once it receives them from the operating system's SMS stack, while device 502 has an operating system which has been designed to handle SMS messages 550 that have destination address information in user data header information elements according to the invention (applications 571 may also operate on device 502, but would not be required as enhanced message handling is native to the OS). Computers 510-511 could be any computing devices, such as laptops, personal computers, servers, tablet computers, or even non-telephony-capable mobile devices. Users desiring to send, receive, or otherwise process enhanced SMS messages 550 according to the invention, using a computer, could either use a message handling application 570 running on the computer's host operating system, or a browser application 561 that interacts with a message handling application 560 provided from an Internet, either by the same or another party (for example, a mobile carrier or a third party service provider). While not shown, it is entirely conceivable that a specialized computer operating system could be provided on computers 510-511 that had embedded support for handling enhanced SMS messages 550 according to the invention.

Figure 6:
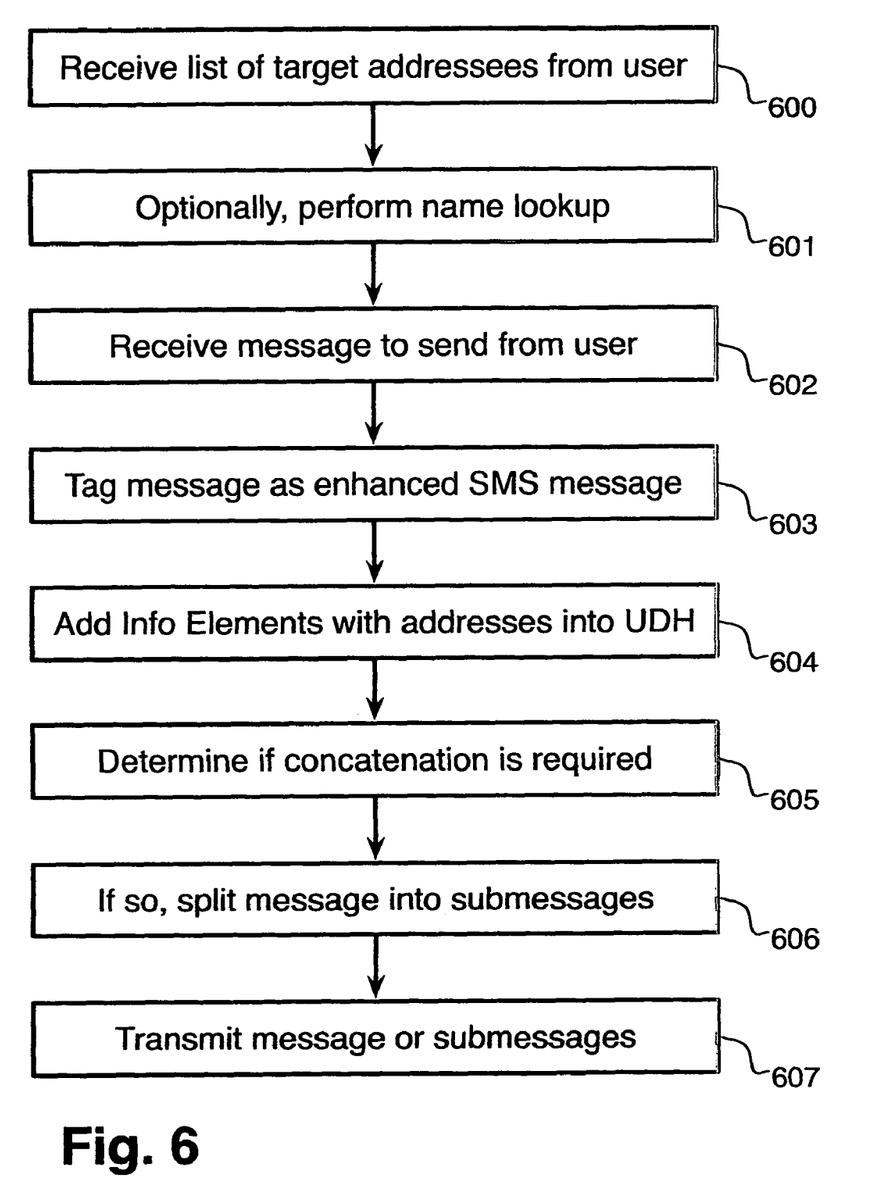
FIG. 6 is a process flow diagram of a method for sending an SMS or similar message with a plurality of "To" or "Copy" addressees, according to a preferred embodiment of the invention.

FIG. 6 provides a basic process diagram of a method for handling SMS or related messages with group sending, receiving, and replying capabilities, according to a preferred embodiment of the invention. In a first step 600, an application or an embedded service or process of a device operating system receives a list of target addressees from a user. Addresses could be purely numerical (for example, mobile phone numbers), or they could be purely textual (for example, all names of intended recipients), or they could be both numerical and textual. Note that it is not required, according to the invention, that every addressee be manually entered in step 600; it is well known in the art of application design that users might want to apply a filter (for example, "get me all of my contacts located in my home county"), or use wildcards (for example, "Ted B*") or precompiled lists (as in "Team") that are processed after the user enters them into discrete addresses. Indeed, group addresses such as "Support Team" can be used in step 600 and embedded in UDH in step 604, as long as any application or operating system that would use the address to actually send SMS messages is equipped to do an appropriate lookup and to convert the group address into a plurality of individual addresses corresponding to terminal devices. In step 601, any textual entries from step 600 are subjected to an optional name lookup to determine if a mobile number is available for any or each of the persons or entities identified by the textual entries from step 600. Note that this step is optional; in some embodiments, names are embedded directly into user data header information elements (step 604 below) as text; in these cases, only recipient applications or systems equipped to handle text-based addresses would be able to use these names. Since it is anticipated that some services using the invention will rely on the existence of tailored applications at all participating senders and recipients, it is intended that any address types capable of being embedded as UDH information elements can be used, according to the invention. In step 602, an application or an embedded service or process of a device operating system receives a message to be transmitted to the recipients received in step 600.

In step 603, the message being assembled can be tagged as an enhanced SMS message, by adding a UDH Information Element with an IEI corresponding to a predetermined value that signifies that the message is enhanced according to the invention. Then, in step 604, all required Information Elements are added to the user data header. These include all addresses added in step 600 (possibly as modified in step 601), and any tags added in step 603 (it is possible to add more than one tag, if for example a particular message is intended to be treated as a relevant message by more than one possible application type at terminal devices). Then, in step 605, a determination is made if concatenation is required. Generally, concatenation will be required if the total length of the user data and the message received in step 602 is greater than any limits specified by applicable SMS technical standards (typically, in PDU Mode, if the total is greater than 133 octets, then concatenation will be required; other specifications could be used according to the invention, such as MMS, that may differ). If concatenation is required, then in step 606 the message is split into an appropriate number of sequenced sub-messages (each containing an information element that indicates its position in the large message). Finally, in step 607, the single or multiple standard-length SMS (or MMS, etc.) message is transmitted to a wireless carrier or a third party provider that provides text messaging services over the Internet. In preferred embodiments, given how SMS network services work, a single message is still sent for each intended addressee, but now each of these messages has, in its user data header, a complete list of the addresses used by the sender.

Figure 7:
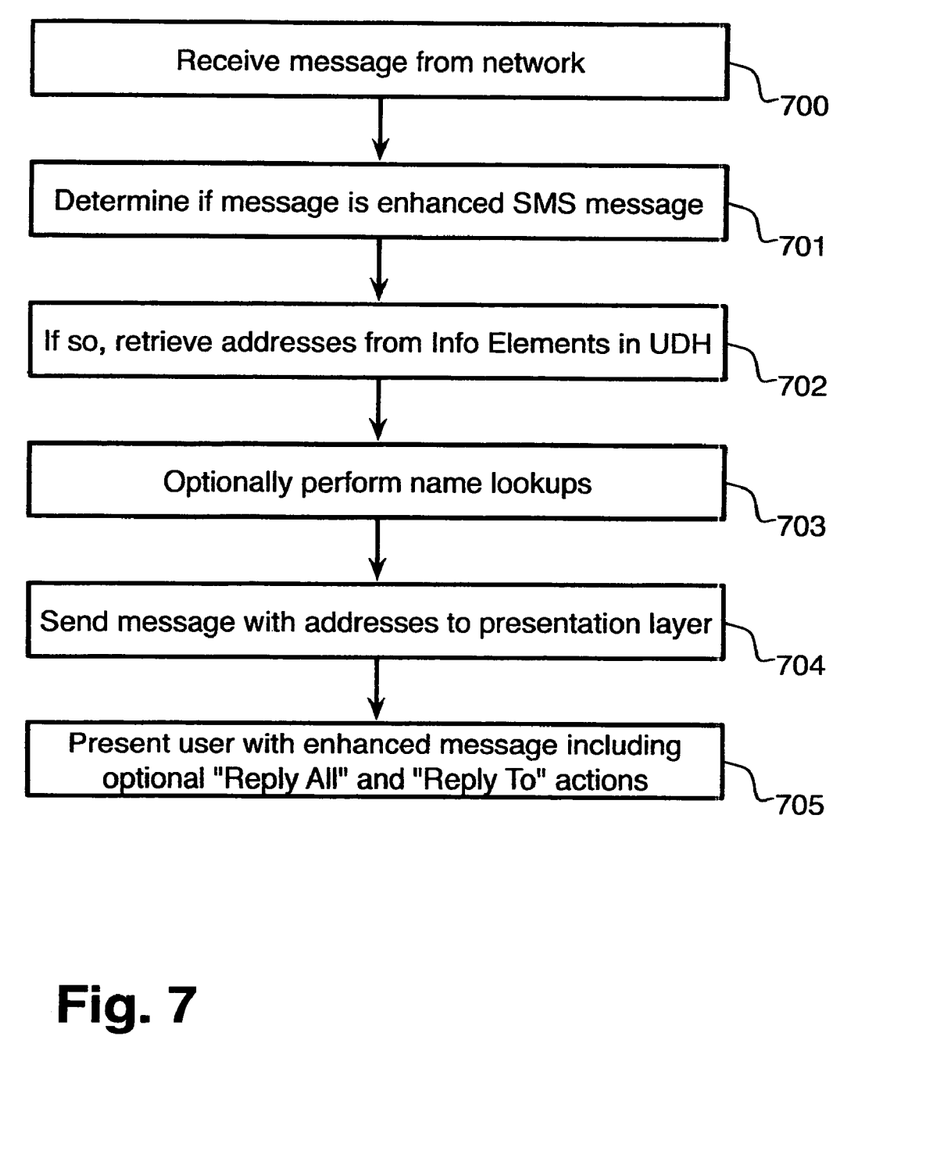
FIG. 7 is a process flow diagram of a method for receiving and displaying an SMS or similar message with a plurality of "Copy" addressees, according to a preferred embodiment of the invention.

FIG. 7 illustrates an exemplary process of a preferred embodiment of the invention that shows how recipient devices handle enhanced SMS messages according to the invention. In step 700, an SMS message is received from a wireless carrier (or possibly from a third party provider that provides SMS messaging services over the Internet). In step 701, the receiving device checks to see whether the received message is an SMS (or MMS, etc.) message that has been enhanced according to the invention. There are several possibilities for doing this. In one embodiment, an application or an embedded service or process of the receiving device's operating system checks to see if any of the Information Elements in the UDH have an IEI that corresponds to one or more enhanced types of messages (recall that more than one "flavor" of enhanced message may coexist within a given device or network, according to the invention—for example, one for playing a game and one for general-purpose enhanced messages). If step 701 determines that the message is not an enhanced message, then the process would end there for that message. If, on the other hand, step 701 returned "true" or returned a type (such as "message for game application"), then in step 702 a set of addresses is obtained from a plurality of Information Elements in the messages user data header (recall that each Information Element will have an IEI that indicates it is an address). In step 703, and optional name lookup is performed. For example, if a particular address is a number, a lookup into a mobile device's contacts or names database would determine if the number corresponds to a known person (for instance, a friend of the recipient's); if so, the number will be augmented by, or replaced with, the associated name resulting from the lookup. In step 704, the received message and all addresses gathered in step 702 (as possibly modified in step 703) are passed to a presentation layer of an application or of the device itself. Finally, in step 705, a user associated with the terminal device where the process of FIG. 7 occurs (which could of course be a mobile phone or a computer, or any other terminal device capable of receiving enhanced SMS messages according to the invention) is presented with an enhanced message that includes the message text (or media, in the case of MMS), and a list of addressees of the message (possibly modified, as by abbreviating, grouping, showing only a first few names, etc., in order to facilitate viewing and navigation), along with optional "Reply All" and "Reply To" actions. It is important to note that according to the invention, the presence (at least in an application or operating system, even if all of them are not shown at once) of a complete list of those to whom the message was originally addressed by its sender, facilitates any number of functional elements that are known in the art but that have not heretofore been possible within SMS or text messaging systems. For example, in one embodiment a "Reply All" action is provided that, if selected, allows a user to compose a reply that will be sent (using the process of FIG. 6) to all of the original addressees (this has not been possible in SMS systems because in the art only the receiving device's address is retained in each copy of the message. In the same or another embodiment, a "Reply To" action is required which presents a list of some or all of the original addressees, and then allows the recipient to edit the list by optionally removing some portion of the addresses, and optionally adding more addresses. These are examples; any functions that rely on the availability of a complete list of original individual or group addressees of the message is possible, and any of these inherently comprises an embodiment of the invention, inasmuch as current SMS systems only deliver one "From:" address with each SMS message (the "To:" is inherently the device on which the message is received, and is never a list of more than one recipient in SMS systems in the art).

Figure 8:
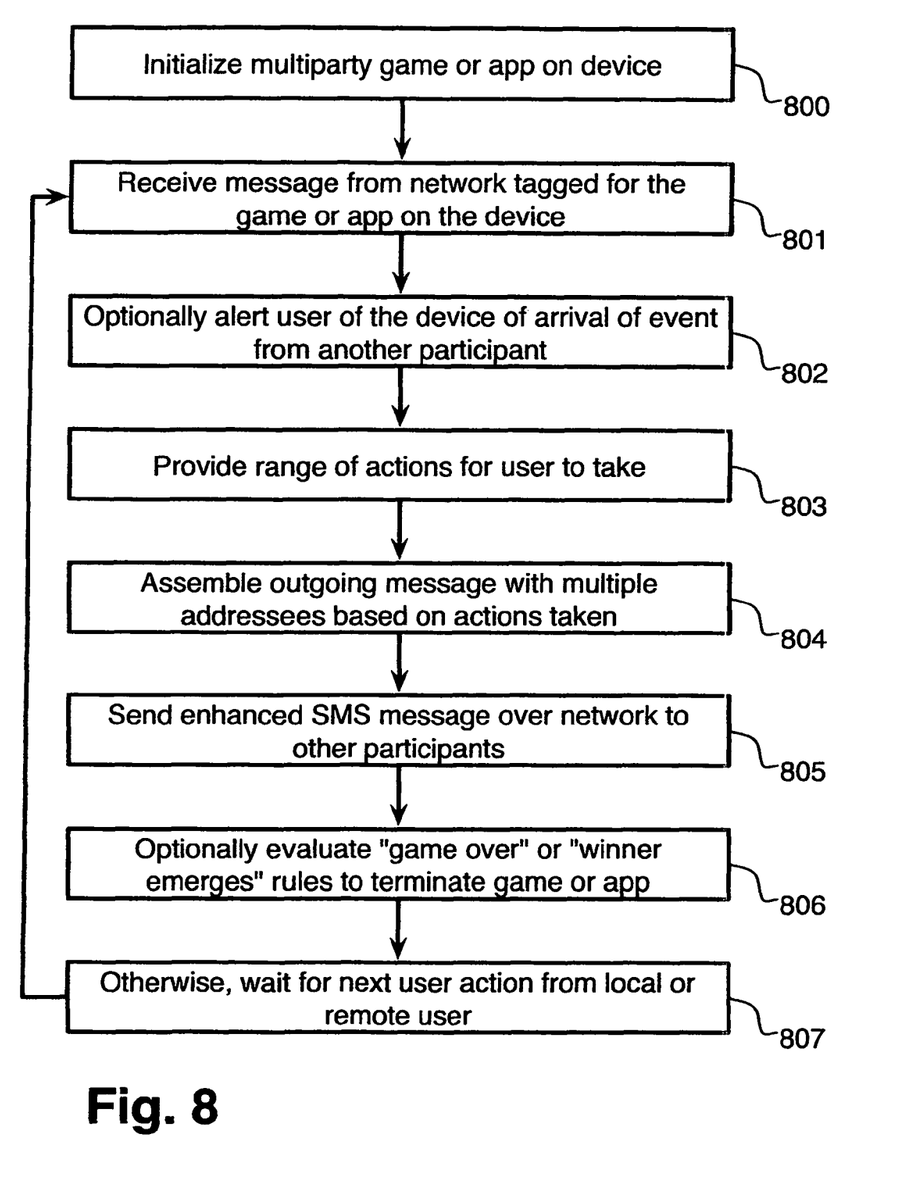
FIG. 8 is a process flow diagram of another preferred embodiment of the invention in which an enhanced SMS messaging system of the invention is used to facilitate execution of a multiparty game or other application across a wireless network.

FIG. 8 illustrates an embodiment of the invention in which a novel use of existing SMS technologies is made possible by virtue of the presence of a complete set of addresses in each enhanced SMS message. In a first step 800, a multiparty game or application is initialized. By way of illustration, a game such as the well-known game of Monopoly™ is initialized by one player or a third party game service by sending each participant an SMS message containing an initial game state (and typically an Information Element in the user data header that identifies the game type and game ID). In another illustrative example, a collaboration application could be initialized by sending each intended participant an SMS containing one Information Element that specifies "this is a collaboration session message" and another that provides a "collaboration session ID" that can be used by all future messages associated with a particular collaboration. Typically, a single Information Element will be used to indicate the type of game or application, and a second Information Element will be used to indicate which particular instance of that type is involved (for example, IEI C1 might be used to indicate "here is game type", and have an Information Element of value "Poker", and IEI C2 might be used to indicate "here is a game globally unique identifier", and have an Information Element that comprises a 64-bit unsigned integer that uniquely identifies a particular Poker game).

Once a game or application is initialized, game or application actions are taken, and state changes communicated (or states synchronized) by use of enhanced SMS messaged that, in most cases, will never been seen as such by end users (that is, enhanced SMS messaging carried out according to the invention is used to provide machine-to-machine communication over an SMS network to facilitate things such as, but not limited to, multiparty games or applications). For example, in step 801, a participant associated with a terminal device receives an enhanced SMS message according to the invention from a wireless carrier or a third party providing SMS services over the Internet (note that, while there any number of process intercommunication methods available over the Internet, they generally are unable to coordinate processes between participants using a mix of mobile feature phones, computers, smart phones, and other terminal devices, all of which can receive SMS messages). In most embodiments, an application such as the initialized game or multiparty application, or an embedded process or service of the terminal device's operating system, will check to see if the received enhanced SMS message is tagged for a game or application that has been initialized on the device (that is, does it have the applicable Information Elements present, as described above, to indicate "this message belongs to the instance of—for example—Poker that it initialized on this machine"?). If the message does not have an appropriate tag, it can be ignored or passed on to other applications for consideration (this can be done, as is common in the art today, by passing each message in a determined order from one possible consuming application to the next, ending ultimately in system default handling, or it can be done in any arbitrary way by a terminal device's operating system or an application running in association with it). If the message does have an appropriate tag, then in step 802 an optional alert may be provided to users associated with the terminal device to inform them of a state change, or action, in a game or application in which that they are a participant. Alerts could be audible or visual, or even tactile (as in vibration of a mobile phone). In step 803, a range of possible actions that a user of the receiving terminal device might take is provided, either when a user responds to an alert from step 802 or when a user brings the game or application in question into focus on the terminal device, or even as a result of a timer event (for example, "Show the user the latest game state every 15 minutes if nothing else happens first"). In step 804, if a user decides to take some action (for example, betting or drawing cards in Poker, or taking a turn in Monopoly™), then an outgoing enhanced SMS message is assembled based on the actions taken, and that includes all of the relevant participants' addresses for inclusion in the message. Then, in step 805, the enhanced SMS message prepared in step 804 is transmitted over a wireless carrier or other appropriate network to other participants in the game or application being conducted. In optional step 806, an evaluation is conducted to determine if a game is over or a winner has emerged, or if a multiparty application should be considered complete for any reason whatsoever, generally by applying preconfigured rules stored either locally on a terminal device or in a third party server in network. If an evaluation does result in a "game over" or "application complete" result, then appropriate enhanced messages are sent to each participant. Otherwise in step 807 a terminal device associated with a user who has taken some action reverts to a "wait state" and waits for a next user action (or time-based event) to be received from a local or remote user or process.

In another embodiment of the invention, and as an example of how multiparty applications can be coordinated using a simple multiparty SMS communications protocol according to the invention, a enhanced game of "hide and seek" suitable for play by adults is carried out using enhanced SMS messaging. According to the embodiment, a plurality of players, each having a mobile terminal device such as a mobile phone, and each of the mobile terminal devices is enabled with a geographic locating system such as a global positioning system (GPS) so that each player is able to determine his physical location (or at least, each player's device is able to determine—such determination could be made without a player's knowledge or participation if appropriate for a particular game). Note that there are exist several such geographic locating systems in the art, but further references will use GPS as an example without limiting the embodiment to use of GPS. At game initiation 800, one player or a third party service acts as host of a game and starts the game by sending a GPS location for each player in the game. Sending of GPS locations is carried out using enhanced SMS messages according to the invention, so that each recipient's game application (operating on her mobile device) is able to receive all of the mobile device addresses to which each enhanced SMS message is sent. According to various ways of carrying out the embodiment, the GPS locations are either inserted into user data Information Elements 303 or in a message payload 304. Also, when GPS locations are passed as part of a user data header 300, they may be passed via individual Information Elements 303 that each carries a destination terminal device identifier such as a mobile phone number and a GPS location; alternatively, destination terminal device identifiers and GPS locations can be sent in separate Information Elements 303. Also, when GPS locations are sent as part of a message payload 304, each player's game application may be configured to suppress this information in some way, for instance by not displaying it, or by displaying only a plain language reference location pre-established in a game database (for instance, "Bob is somewhere in the mall", or "Sally is near the South Street Station"). It will be recognized that there are many possibilities in the art that may be used to provide rich game play experiences for participants. Similarly, there may be any number of terminating conditions to be evaluated in step 806, such as when one player has successfully determined the location of every other player and become the winner, or alternatively when a timeout occurs and a winner is declared based on some measurement of overall success determined within a hosting player's or service provider's application.

In another exemplary embodiment, a multiparty communications technique according to the invention can be used to assist in fleet management with only inexpensive coding required, and using a widely available SMS service as a messaging infrastructure. For example, using enhanced SMS messages of the invention, each mobile unit (such as a snow plow, delivery vehicle, or police patrol vehicle) could send an enhanced SMS message to a plurality of other mobile units (and optionally to a plurality of geographically-fixed coordinating stations), each such enhanced message containing a destination terminal address of each of the plurality of other mobile units (and of each of the plurality of coordinating stations). The message from a mobile unit could include status information such as its location and conditions at its location, and possibly actions being taken and readiness to take other actions (for instance, "vehicle is at $3^{rd}$ Street and Waukegan Avenue traveling south on 3$^{rd}$ Street, clearing snow, with a full load of salt available", or "unit 501 is patrolling Central Park East and has a K9 unit aboard"). Such status messages can of course be in a message payload 304 or in user data header 300 as one or more Information Elements 303. In some embodiments, locations of other mobile units are displayed on a mapping application within some or perhaps each mobile unit, so that mobile unit operators are aware of locations of their peers. Update messages (that is, status or location update messages sent using enhanced SMS messages according to the invention) can be sent at periodic intervals, automatically when a status change occurs, or manually when an operator, for example, presses a "Send Update" button on a mobile terminal device. According to an exemplary embodiment, each participating mobile unit is enabled, by regular sending and receiving of messages as described above, to maintain awareness of the locations of a plurality of other mobile units and potentially to coordinate activities. For example, if a snow plow driver saw a stuck car while plowing a particular road, he could send an enhanced SMS message using a GPS receiver in his mobile unit that allows him to type messages and send them to all active mobile units; in this case, a message might state "Assisting stranded driver at location X; no medical assistance needed". It will be appreciated that this example shows how a system and method for electronic messaging with group sending, receiving, and replying capabilities can provide an easy-to-deploy mobile messaging system for many uses, which does not require special radio infrastructure (which point-to-point systems often do), business arrangements (since the billing systems for SMS are already in place), or network protocols (since an existing simple SMS standard can be used without changes), and that provides a robust framework on which a wide variety of useful services, games, applications, and the like can be readily overlaid.

The example shown in FIG. 8 is just that: it is an example of what is possible using process-to-process communication among a plurality of processes using basic SMS messaging as an interprocess communications modality. Because of the ability, new with embodiments of the instant invention, to pass multiple addresses along with each enhanced SMS message, an inherent limitation of the SMS system (which remains because it is part of why the system is so robust, inexpensive, ubiquitous, and heavily used by consumers with all types of devices) is overcome to make SMS messaging a powerful tool with many possible uses. Accordingly, it should be realized that all of the embodiments outlined in this disclosure are exemplary in nature and should not be construed as limitations of the invention except as claimed below.

What is claimed is:

1. A system for electronic messaging, comprising:
a first device adapted to send and receive electronic messages using a short message service protocol of a wireless communications network; and
a plurality of second devices adapted to send and receive electronic messages using a short message service protocol of a wireless communications network;
wherein the first device assembles a plurality of electronic messages using a short message service protocol to send to a plurality of second devices, each of the plurality of assembled electronic messages comprising a primary destination address of one of the plurality of second devices and a plurality of additional destination addresses corresponding to each of the remainder of the plurality of second devices, the additional destination addresses contained in a user data header information element of the electronic message corresponding to an IEI unreserved by industry standards and sends each of the plurality of electronic messages to the one of the plurality of second devices specified by its primary destination address; and
further wherein each one of the second devices receives an electronic message from the first device comprising all of the destination addresses entered by the first device into the plurality of electronic messages sent to the plurality of second devices.

2. The system of claim 1, wherein at least one of the second devices is adapted to reply to the first device and at least one other second device using at least one destination address retrieved from an information element in a user data header of the electronic message.

3. The system of claim 1, wherein the first device is a server adapted to receive an electronic message from a user over a data network and to then submit the electronic message using a short message protocol of a wireless communications network.

4. An electronic messaging method, comprising the steps of:
(a) assembling, on a first device adapted to send and receive electronic messages using a short message service protocol of a wireless communications network, a plurality of electronic messages using a short message service protocol to send to a plurality of second devices adapted to send and receive electronic messages using a short message service protocol of a wireless communications network, each of the plurality of assembled electronic messages comprising a primary destination address of one of the plurality of second devices and a plurality of additional destination addresses corresponding to each of the remainder of the plurality of second devices, the additional destination addresses contained in into a user data header information element of the electronic message corresponding to an IEI unreserved by industry standards and sends each of the plurality of electronic messages to the one of the plurality of second devices specified by its primary destination address; and
(b) receiving, at each one of the second devices, an electronic message from the first device comprising all of the destination addresses entered by the first device into the plurality of electronic messages sent to the plurality of second devices.

* * * * *